United States Patent
Khan et al.

(10) Patent No.: US 8,793,362 B2
(45) Date of Patent: Jul. 29, 2014

(54) COMMUNICATIONS ENTERPRISE SERVER MONITOR

(75) Inventors: Arif Khan, Bronx, NY (US); William J. Petz, College Point, NY (US); Timothy J. Calabro, Brooklyn, NY (US)

(73) Assignee: Barclays Capital Inc., New York, NY (US)

( * ) Notice: Subject to any disclaimer, the term of this patent is extended or adjusted under 35 U.S.C. 154(b) by 545 days.

(21) Appl. No.: 11/987,418

(22) Filed: Nov. 29, 2007

(65) Prior Publication Data
US 2009/0144413 A1    Jun. 4, 2009

(51) Int. Cl.
*G06F 15/16* (2006.01)

(52) U.S. Cl.
USPC ........... 709/224; 709/223; 709/225; 709/219; 455/67.11; 455/67.12; 455/411

(58) Field of Classification Search
USPC .......................................... 455/466; 379/265
See application file for complete search history.

(56) References Cited

U.S. PATENT DOCUMENTS

| | | | |
|---|---|---|---|
| 6,349,335 B1 * | 2/2002 | Jenney .......................... | 709/224 |
| 2002/0073171 A1 * | 6/2002 | McDowall et al. ........... | 709/217 |
| 2003/0083756 A1 | 5/2003 | Hsiung et al. | |
| 2003/0109951 A1 | 6/2003 | Hsiung et al. | |
| 2005/0216421 A1 | 9/2005 | Barry et al. | |
| 2006/0161626 A1 * | 7/2006 | Cardina et al. ................ | 709/206 |
| 2006/0217115 A1 * | 9/2006 | Cassett et al. ................ | 455/423 |
| 2006/0246889 A1 * | 11/2006 | Buchhop et al. .............. | 455/425 |
| 2007/0245008 A1 * | 10/2007 | Matsui et al. ................. | 709/223 |
| 2008/0063178 A1 * | 3/2008 | Paden et al. .............. | 379/265.06 |
| 2008/0133517 A1 * | 6/2008 | Kapoor et al. ................... | 707/6 |
| 2009/0209256 A1 * | 8/2009 | Nakashima et al. .......... | 455/436 |
| 2010/0197238 A1 * | 8/2010 | Pathuri et al. .............. | 455/67.11 |

FOREIGN PATENT DOCUMENTS

| | | |
|---|---|---|
| JP | 2003/502887 | 1/2003 |
| JP | 2004/264984 | 9/2004 |
| JP | 2007/501572 | 1/2007 |

OTHER PUBLICATIONS http://www.networkworld.com/news/2007/071607-blackberry-corporate-monitoring-software.html "Zenprise Updates BlackBerry Monitoring Software"—Jun. 2007 John Cox, Network World.*
http://atechnologies.com/datasheets/zenprise/Blackberry/11-Datasheet-DS_BlackBerry.pdf "Zenprise for Blackberry: Proactively Troubleshoot and Resolve End-User and Infrastructure Problems"—Zenprise, Apr. 2007.*
BoxTone, Best Practices for Enterprise Mobile User Management. White Paper [online]. Boxtone, [retrieved on Sep. 28, 2007]. Retrieved from the Internet <URL: http://www.boxtone.com/GetDocument.aspx?DocumentId=19>.

(Continued)

*Primary Examiner* — Randy Scott
(74) *Attorney, Agent, or Firm* — Morgan Lewis & Bockius LLP

(57) ABSTRACT

A system includes one or more wireless handheld devices, one or more enterprise servers in communication with the one or more wireless handheld devices, and an enterprise server monitor in communication with the one or more enterprise servers to collect communications performance data from one or more of the one or more enterprise servers in communication with one or more of the one or more wireless handheld devices associated with a select group of users, and to generate one or more alerts if the collected communications performance data match one or more alert conditions, the one or more alert conditions being indicative of one or more levels of potential communication failures.

26 Claims, 12 Drawing Sheets

(56) References Cited

OTHER PUBLICATIONS

NeedText™ Monitor for BlackBerry™ Enterprise Server, 2005, [online]. NeedText™, [retrieved on Sep. 28, 2007]. Retrieved from the Internet < URL: http://www.re-soft.com/product/needtext.htm>.
Zenprise—Blackberry Monitoring & Zenprise—Company, 2007, [online]. Zenprise, [retrieved on Sep. 28, 2007]. Retrieved from the Internet <URL: http://www.zenprise.com/products/blackberry-monitoring.aspx & http://zenprise.com/company/index.aspx>.
Zenprise for Blackberry: Proactively Troubleshoot and Resolve End-User and Infrastructure Problems. Product Brochure [online]. Zenprise, 2007, [retrieved on Sep. 28, 2007]. Retrieved from the Internet <URL: http://www.zenprise.com/resources/pdfs/Zenprise-DS_BlackBerry.pdf>.
Blackberry Enterprise Server, [online], [retrieved on Sep. 28, 2007]. Retrieved from the Internet <URL: http://en.wikipedia.org/wiki/BlackBerry_Enterprise_Server>.
What is a Blackberry, and how does it work?, Aug. 22, 2007, [online], Indiana University, University Information Technology Services, [retrieved on Oct. 1, 2007] Retrieved from the Internet <URL: http://kb.iu.edu/data/aljq.html>.
Blackberry Enterprise Server, [online], Blackberry, [retrieved on Sep. 28, 2007] Retrieved from the Internet <URL: http://na.blackberry.com/eng/services/server>.
SNMP Monitoring for the Blackberry Enterprise Server. White Paper [online]. Research in Motion, 2006 [retrieved on Sep. 28, 2007]. Retrieved from the Internet <URL: http://www.blackberry.com/knowledgecenterpublic/livelink.exe/fetch/2000/7979/1181821/278286/745137/SNMP_Monitoring_for_the_BlackBerry_Enterprise_Server.pdf?nodeid=1233956&vernum=0>.
Written Opinion of PCT/US2008/013099 dated Jan. 12, 2009, 3 pages.
International Search Report of PCT/US2008/013099 dated Jan. 12, 2009, 3 pages.
International Preliminary Report on Patentability of PCT/US2008/013099 dated Jun. 10, 2010, 5 pages.
Publication of PCT/US2008/013099 dated Jun. 4, 2009, 36 pages.
Japanese Patent Application No. 2010-535996, Notice of Reasons for Rejection, dated Jan. 4, 2013, 9 pages.

\* cited by examiner

Configuration

Database Server: ☐
Database Name: ☐
Database Login: [Bb_roall]

Database Password: [******]

Alert To: [bbsupport]  (SMTP addresses separated by comma)
Pending: [10]  (Max number of pending e-mails before alert)

Work Hours

Last Contact: [30]  (Max number of minutes each for group)
Last Contact Count: [3]  (Number of people with same Last Contact)

Non-Work Hours

● Enabled    ○ Disabled
From: [18]  (Beginning of non-work hours)
To: [6]  (End of non-work hours)
Last Contact: [90]  (Max Number of minutes each for group)
Last Contact Count: [4]  (Number of people with same last contact)

FIG. 4

| User ID | Pending | Last Sent Time/ Last Forward Time | Present Date/ Time | Last Contact | Enterprise Server |
|---|---|---|---|---|---|
| User 1 | 11 | 10:30 AM | 12:00 PM | 1 Hr(s) 30 Mins | ES01 |
| User 2 | 12 | 10:21 AM | 12:00 PM | 1 Hr(s) 39 Mins | ES01 |
| User 3 | 15 | 10:20 AM | 12:00 PM | 1 Hr(s) 40 Mins | ES06 |
| User 4 | 13 | 10:30 AM | 12:00 PM | 1 Hr(s) 30 Mins | ES07 |

FIG. 5

From: ESWatcher Service    Sent: Date, Time
To: IT
CC:
Subject: Alerts - Carrier Server:  ES01
User:    User 1 (11) [1 Hr(s) 30 Mins] <60%>;
         User 2 (12) [1 Hrs 39 Mins] <30%>

Server:  ES06
User:    User 3 (15) [1 Hrs 40 Mins] <10%>

Server:  ES07
User:    User 4 (13) [1 Hr 30 Mins] <20%>

FIG. 6

From: ESWatcher Service     Sent: Date, Time
To: IT
CC:
Subject: Alerts – Server Server: ES01
User: User 1 (11) [1 Hrs 30 Mins] <70%>
        User 2 (12) [1 Hrs 39 Mins] <30%>
        User 3 (15) [1 Hrs 40 Mins] <10%>

FIG. 7

From: ESWatcher Service     Sent: Date, Time
To: IT
CC:
Subject: Alerts – Client Server:    ES01
User:      User 4 (11) [1 Hrs 30 Mins] <70%>

FIG. 8

COMMUNICATIONS ENTERPRISE SERVER MONITOR

BACKGROUND OF THE INVENTION

1. Field of the Invention

The present invention relates to systems and methods for monitoring the availability and performance of a communications enterprise server, and more particularly to a system and method for monitoring the availability and performance of an enterprise server communicating with wireless handheld devices.

2. Discussion of the Related Art

Because of the mobile nature of today's society, wireless handheld devices play a critical role in enterprises. Wireless handheld devices allow users to send and receive email, for example, over wireless networks. An example of one such device is the BlackBerry®, which was introduced in 1999, that supports push e-mail, mobile telephone, text messaging, internet faxing, web browsing and other wireless information services.

Generally, if there are performance issues with the email services in an enterprise, such as a system outage or slow system performance, affected users of the service will notify the Information Technology (IT) help desk of the enterprise about the issues. The first-level IT support must handle all of the phone calls or other communications and address each user's problems individually. The first-level IT support may not even know there is a system-wide problem when working to solve each user's complaint until a large number of service problems of a similar nature has been logged. By then, many users have already been affected, and IT support has to rush to figure out the source of the problem in a reactive manner. Thus, there remains a need for a system, method, and software that acts as a centralized link between wireless handheld devices, enterprise applications, and wireless networks to proactively monitor the performance of the communications to detect early warning signs of systemic failures.

SUMMARY OF THE INVENTION

Accordingly, the present invention is directed to an enterprise server monitor that substantially obviates one or more problems due to limitations and disadvantages of the related art.

An object of the present invention is to provide a system and method for monitoring one or more enterprise servers running communications applications.

Another object of the present invention is to provide a system and method for proactively monitoring enterprise servers running communications applications for performance issues.

Another object of the present invention is to provide a system and method to monitor select users of wireless handheld devices for issues related to the delivery of content while taking into account performance conditions such as whether the issues are occurring during work hours or non-work hours, status of the wireless handheld device, or the battery level of the wireless handheld device.

Yet another object of the present invention is to provide a system and method for identifying whether the detected performance issue is originating from the enterprise network or carrier networks.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes one or more wireless handheld devices, one or more enterprise servers in communication with the one or more wireless handheld devices, and an enterprise server monitor in communication with the one or more enterprise servers to collect communications performance data from one or more of the one or more enterprise servers in communication with one or more of the one or more wireless handheld devices associated with a select group of users, and to generate one or more alerts if the collected communications performance data match one or more alert conditions, the one or more alert conditions being indicative of one or more levels of potential communication failures.

In another aspect, an enterprise server monitor includes a server in communication with one or more enterprise servers, the one or more enterprise servers in communication with one or more wireless handheld devices, the server including a watcher service to collect communications performance data from one or more of the one or more enterprise servers in communication with one or more of the one or more wireless handheld devices associated with a select group of users, and to generate one or more alerts if the collected communications performance data match one or more alert conditions, the one or more alert conditions being indicative of one or more levels of potential communication failures.

In yet another aspect, a method includes selecting one or more users of one or more wireless handheld devices for monitoring, collecting communications performance data from one or more enterprise servers in communication with the one or more wireless handheld devices, comparing the collected communications performance data with one or more alert conditions, and generating one or more alerts if the collected communications performance data match one or more alert conditions, the one or more alert conditions being indicative of one or more levels of potential communication failures.

In still yet another aspect, a computer program product including a computer readable medium having stored thereon computer executable instructions that, when executed on a computer, configure the computer to perform a method comprising the steps of selecting one or more users of one or more wireless handheld devices for monitoring, collecting communications performance data from one or more enterprise servers in communication with the one or more wireless handheld devices, comparing the collected communications performance data with one or more alert conditions, and generating one or more alerts if the collected communications performance data match one or more alert conditions, the one or more alert conditions being indicative of one or more levels of potential communication failures.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4 illustrates an exemplary configuration interface;

FIG. 5 illustrates an exemplary database table in accordance with the present invention; and FIGS. 6-8 illustrate exemplary screens in accordance with the present invention.

DETAILED DESCRIPTION OF THE EMBODIMENTS

Reference will now be made in detail to the embodiments of the present invention, examples of which are illustrated in the accompanying drawings.

Figure 1:
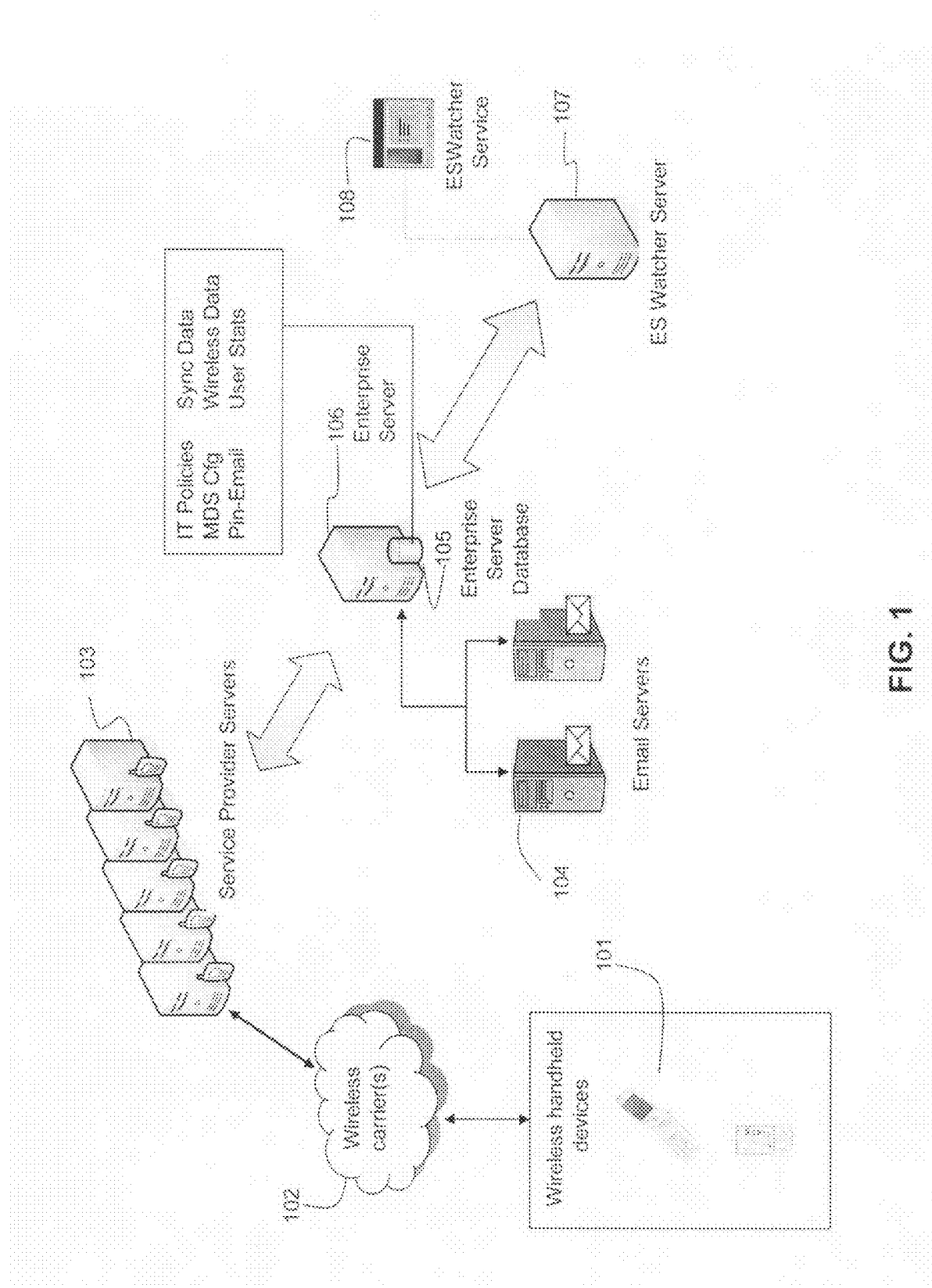
FIG. 1 illustrates a system diagram of an exemplary embodiment of the present invention.

FIG. 1 shows a network diagram illustrating an exemplary embodiment of the present invention. As shown in FIG. 1, the exemplary system of the present invention includes wireless handheld devices 101 for sending and receiving information, such as electronic mail or calendar data. The information may be stored on enterprise-class email systems, such as email servers 104. Microsoft Exchange® servers and Domino® servers are examples of email servers 104. The email servers 104 may communicate directly with the enterprise server ("ES") 106 and ES database 105. For example, the wireless handheld devices 101 may be Blackberry® devices, the service provider may be a provider of Blackberry® service, the enterprise servers may be Blackberry® enterprise servers ("BES"), and databases may be BES databases. However, other types of communication devices and communication services and protocols may be used without departing from the scope of the present invention.

In the exemplary embodiment, the ES 106 has an ES application linking the wireless handheld devices 101, the wireless carriers 102, and the email servers 104. The ES application may be used to synchronize email and other information, such as personal information or corporate data between a computer desktop and the wireless handheld device 101 of a user. In some embodiments, there may be a plurality of enterprise servers 106 running the ES application. As shown in FIG. 1, the ES database 105 is included in the ES 106 running the ES application. However, other combinations may be used without departing from the scope of the present invention. For example, the ES database 105 may be located on one or more separate database servers in communication with the ES application running on a plurality of enterprise servers 106.

Examples are provided to illustrate sending and receiving email through a wireless handheld device 101. To receive email through a wireless handheld device 101, the drafted email is sent to the email server 104 to be delivered to the wireless handheld device 101. The ES 106 locates the email and forwards it to the service provider servers 103 through a network, such as the Internet. The service provider servers 103 then send the email to one or more wireless carriers 102. The wireless carriers 102 then transmit the email to the wireless handheld device 101 for viewing. To send email from the wireless handheld device 101, the process may be reversed.

The ES database 105 stores, among other things, data related to the communications between the wireless handheld devices 101 and the ES 106. Some of the data include, but are not limited to, IT policies, mobile data service ("MDS") configurations, personal identification number ("PIN") email data, user statistics, sync data, wireless data, and any other information concerning the communications betweens the wireless handheld devices 101 and the ES 106. For example, the PIN-email data is used by the wireless handheld device 101 to identify the device and ensure that the email or other data destined for a particular individual assigned to the wireless hand held device 101 is delivered properly. The data may provide the appropriate settings for a wireless handheld device 101 to work within the restrictions of an enterprise and may provide statistics on a user's usage of a wireless handheld device 101. The statistics aid in categorizing a wireless handheld device 101 by the ES watcher service 108. The data also may help in providing routing and communication between the ES 106 and the service provider servers 103.

The ES 106 feeds the communications data stored in the ES database 105 to an ES watcher server 107. The ES watcher server 107 includes an ES watcher service 108 that monitors the communications data fed to the ES watcher server 107. The ES watcher service 108 may be a service application run in the background without any user intervention. The ES watcher service 108 monitors activities on the ES 106 or ES database 105 for any issues relating to the communications between the ES 106 and the wireless handheld device 101, such as successful delivery of content, for example. The communications issues may include internal issues, such as events between the email servers 104 and the ES 106, or external issues, such as events between the ES 106 and the service provider servers 103 and/or wireless carriers 102. Other network affecting events, such as building outages that may disrupt the communications service are also monitored. In some embodiments where there are multiple enterprise servers 106 or ES databases 105, the ES watcher service 108 receives activity feeds from the multiple enterprise servers 106 or ES databases 105.

If the ES watcher service 108 is running and is in an active state, the ES watcher service 108 accesses data stored in the enterprise server 106 at a refresh period. The refresh period may be modified. For example, a refresh period of ten minutes may be used, and the ES watcher service 108 accesses data stored in the enterprise server every ten minutes.

The ES watcher service 108 in accordance with the present invention proactively identifies potential or confirmed communications performance issues. Once the ES watcher service 108 identifies potential or confirmed issues, it notifies the appropriate personnel of the performance issues by generating alerts. Thus, the ES watcher service 108 can prevent large numbers of wireless handheld device users from having to notify the appropriate personnel of issues with their communications services.

To determine the likelihood of a system-wide failure, the ES watcher service 108 monitors communications between the ES 106 and the wireless handheld device 101. The ES watcher service 108 may generate alerts when defined conditions are met, such as if a threshold value is exceeded. For example, the threshold values may include a maximum number of pending messages or a maximum amount of time since a wireless handheld device has contacted a server. If a wireless handheld device 101 exceeds these threshold values, then an alert will be generated for that particular wireless handheld device 101. The alert may list the conditions that caused the alert to be generated. If a problem with the communications service exists, then IT personnel can proactively address the problem. Based on the date or time monitoring is occurring by the ES watcher service 108, criteria for when to generate alerts may vary. For example, one set of criteria may be used during work hours and another set of criteria may be used during non-work hours. When generating alerts, the ES watcher service 108 may also include analysis rules that take into account the status of the wireless handheld device 101.

For example, the battery level of the wireless handheld devices and whether the wireless handheld device has been muted may be considered by the ES watcher service 108. If a wireless handheld device has been muted, then an alert will not be generated for that device. If the battery level of a wireless handheld device is low, then the alert will notify the appropriate personnel of this factor as there may not be an issue with communications service for this device. Other conditions may be used without departing from the scope of the present invention.

A user interface, such as a web browser, may be used to configure the ES watcher service 108 and to view warnings and alerts generated. FIG. 4 is an example of an interface for configuration. Alternatively, the warnings and alerts may be received on handheld wireless devices assigned to users in charge of monitoring the communications system. For example, the ES watcher service 108 can be configured through a web interface to accept identification information of individuals, groups, or organizations who will receive alerts generated by the ES watcher service 108. The ES watcher service 108 can be configured to accept source mailboxes being monitored by the ES watcher service 108. The source mailboxes for monitoring are selected from among those that will provide a sampling of the communications activity, such as the mailboxes of high profile or frequent users of email, for example. The users of email selected for monitoring generally rely heavily on the communication between the ES 106 and the wireless handheld devices 101, and may include senior management, executives, or IT support individuals with on-call duties. The ES watcher service 108 is configured with conditions for generating alerts. For example, as shown in FIG. 4, the exemplary interface includes conditions, such as the maximum number of pending messages allowed before an alert is generated, the maximum time period of last contact a user should have with the ES 106, and a description of work-hours and non-work-hours. Other conditions may be included without departing from the scope of the invention.

The ES watcher service 108 may also receive input relating to users who have been temporarily or permanently "muted." For example, if a user is "muted," the ES watcher service 108 will not generate alerts for the wireless handheld device 101 of that user. Muting a user may include identifying through the ES watcher service 108 the source mailboxes that need to be "muted" and the reason for muting. The "muted" users are stored in the Users.xml file 302a to be described further below. For temporary muting, the user may be "unmuted" either manually or after a designated expiration date or time has passed.

Figure 2A:
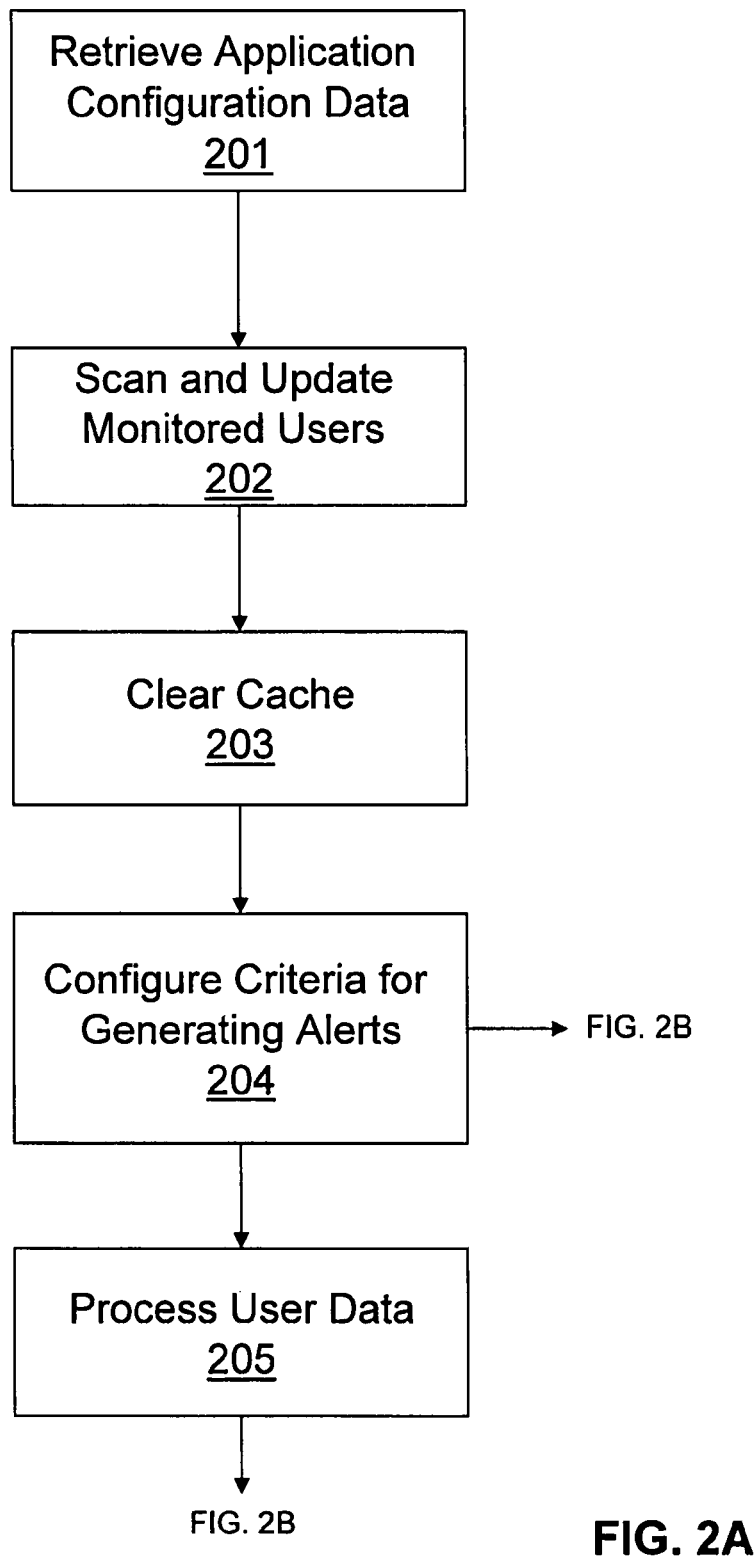
FIGS. 2A-2D illustrate-exemplary process flows in accordance with the present invention.
Figure 2B:
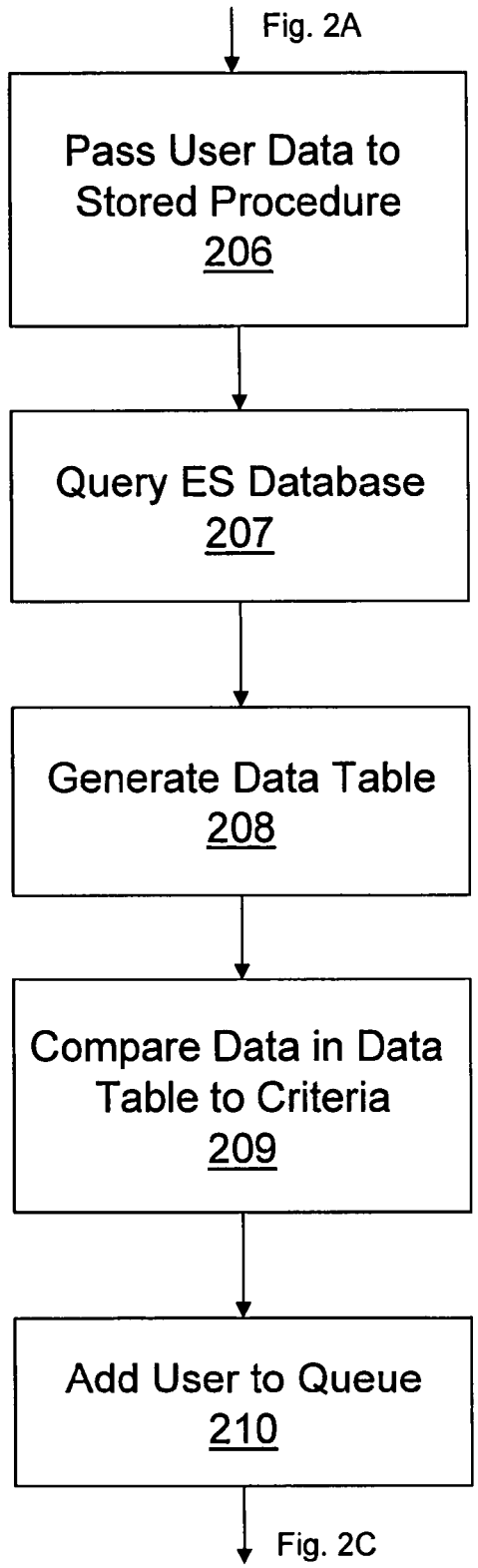
Figure 2C:
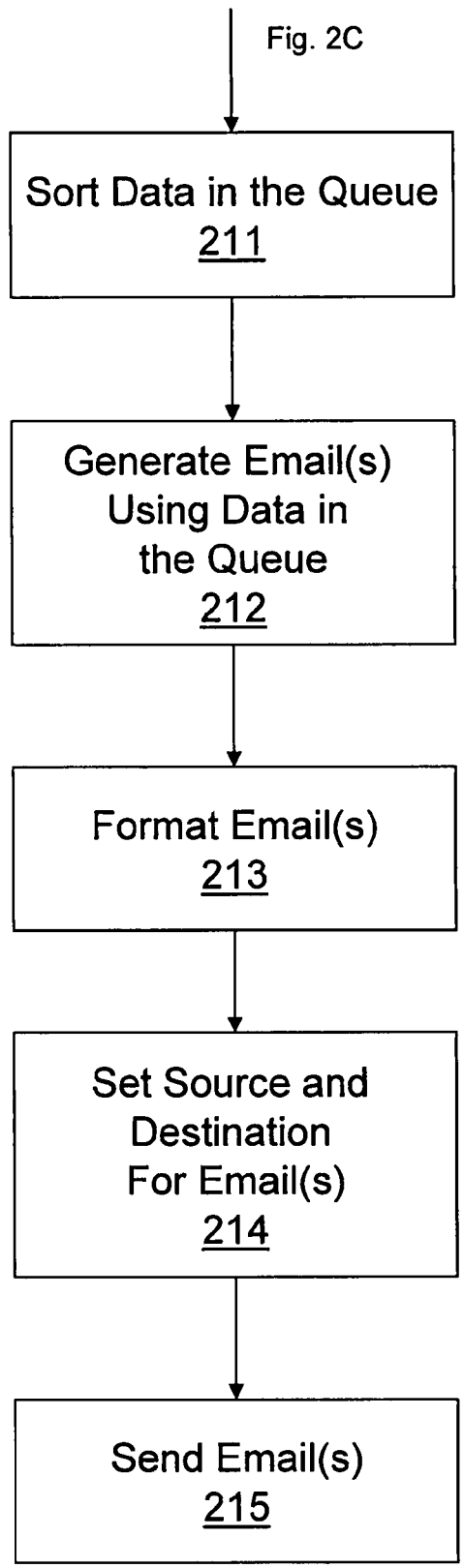
Figure 2D:
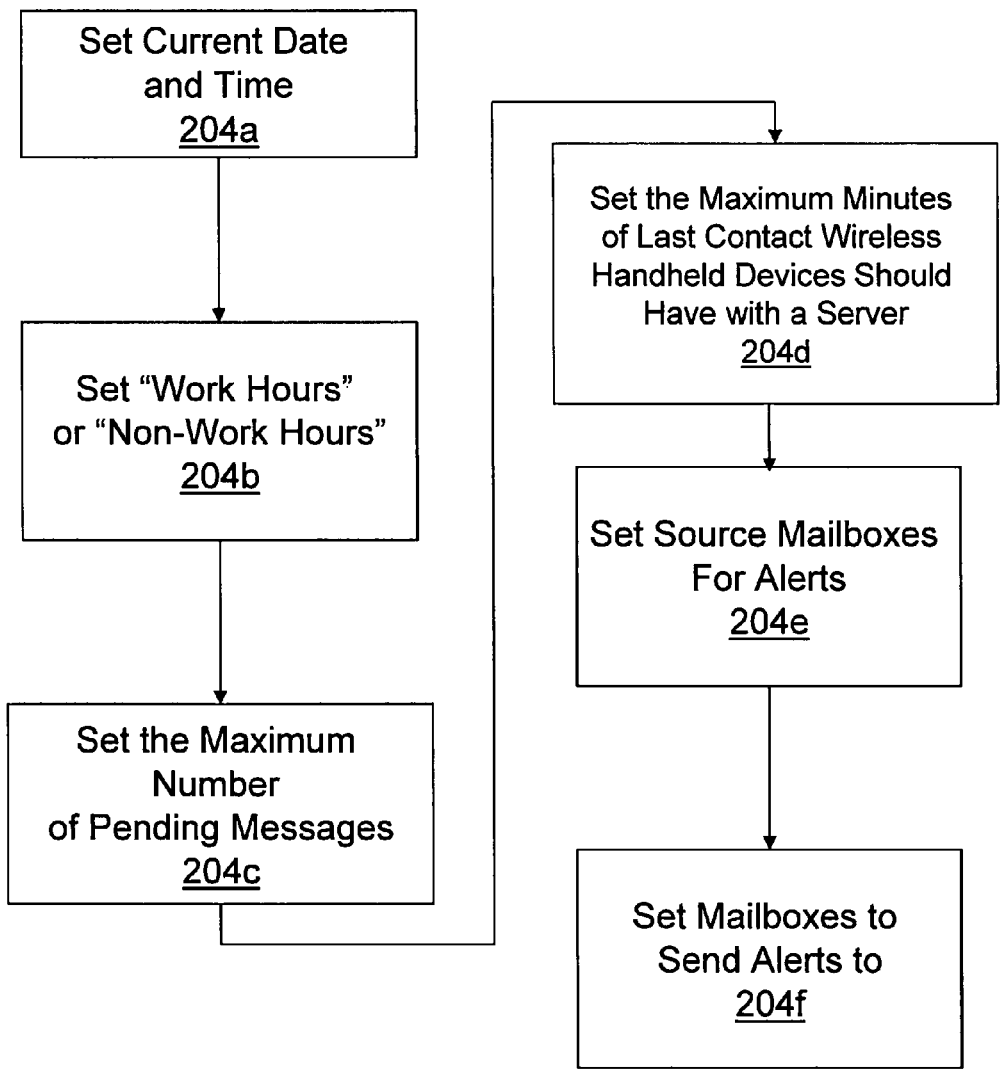
Figure 3A:
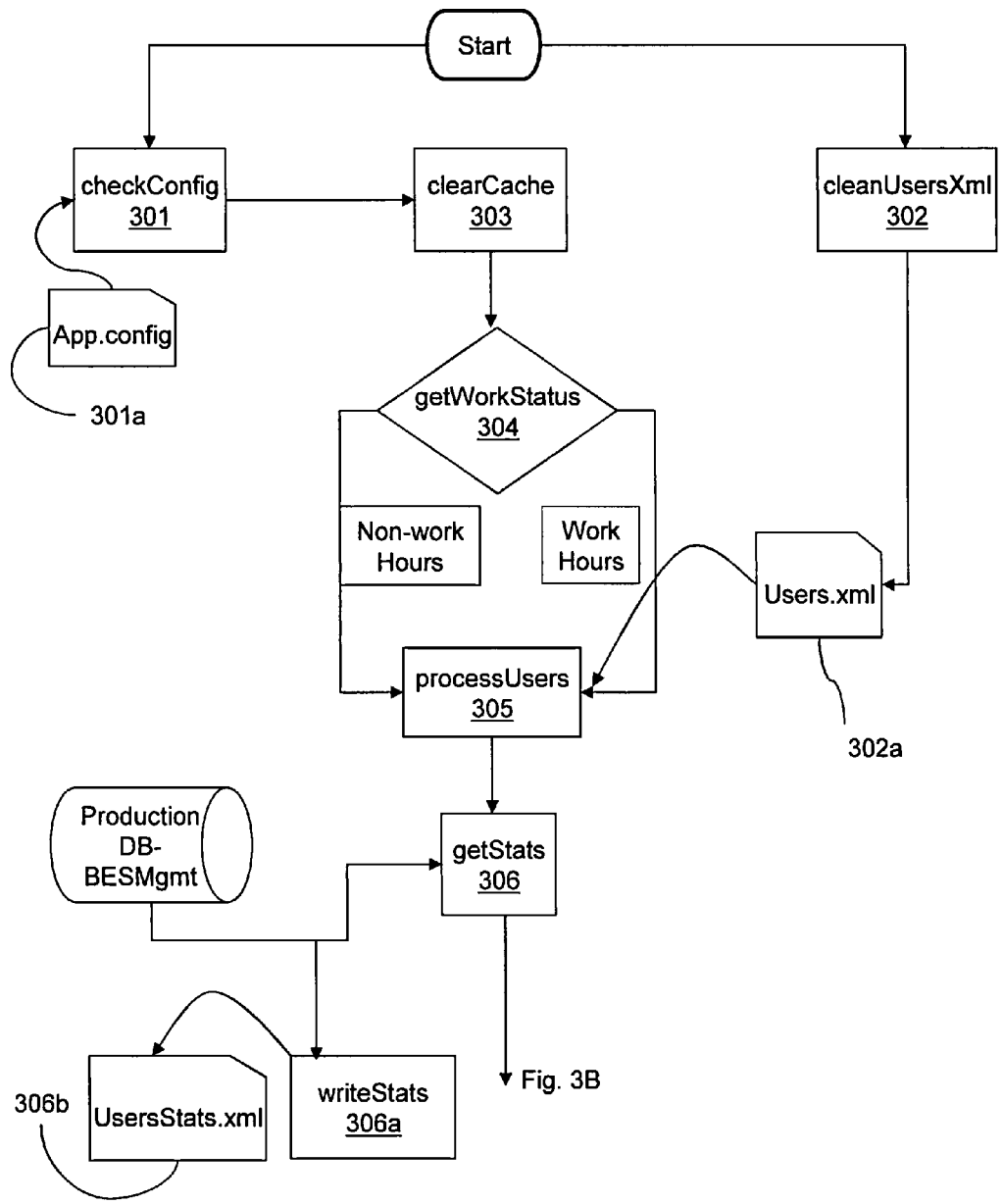
FIGS. 3A-3B illustrate exemplary service flows in accordance with the present invention.
Figure 3B:
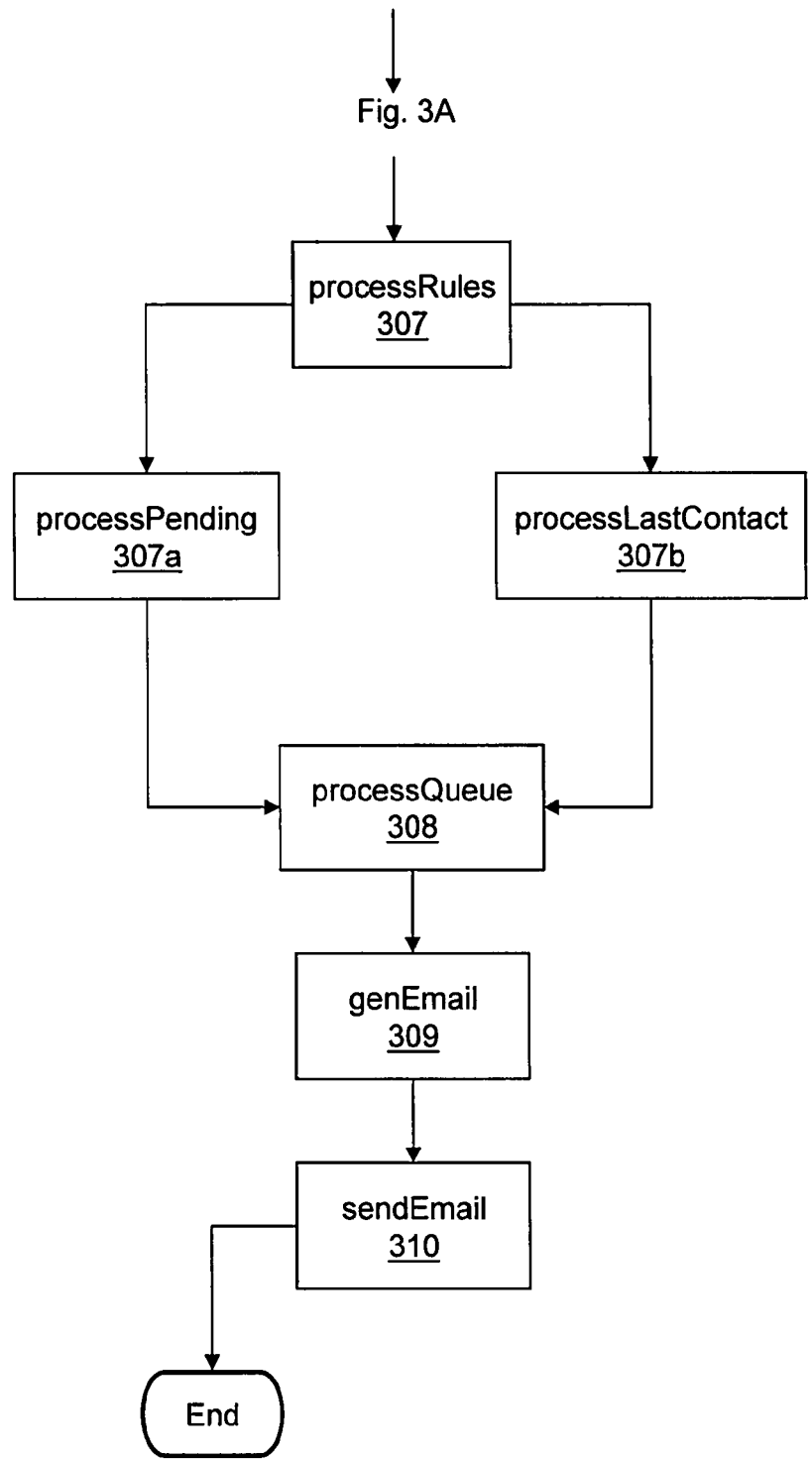

FIGS. 2A-2D illustrate an exemplary monitoring process performed by the ES watcher service 108. FIGS. 3A and 3B illustrate an exemplary flow of the service running on the ES watcher server 107. For example, FIGS. 3A and 3B illustrate exemplary calls performed by the ES watcher service 108 during the exemplary monitoring process illustrated in FIGS. 2A-2D.

In an exemplary embodiment, the ES watcher service 108 retrieves application configuration data (step 201). To retrieve application configuration data, the function checkConfig 301 retrieves initial values for the primary settings or configurations of the ES watcher service 108 from the App.config file 301 including configuration data accepted by the ES watcher service 108 during configuration.

FIG. 4 is an exemplary configuration interface for entering configuration data. For instance, the configuration data includes conditions and management of the alerts, such as identifying to whom the alerts are to be sent, the source mailboxes for the alerts, the maximum number of pending messages allowed before an alert is generated, the maximum time period of last contact a wireless handheld device should have with the ES 106 before an alert is generated, and/or a description of work-hours and non-work-hours. For further accuracy, the configuration data may include additional criteria, such as whether the handheld wireless devices have been turned off/on and/or are out of battery life. The data for a user's last contact may be based on the last forward time of a message or the last sent time a message was sent. For purposes of example only, criteria may be set where if three of the selected wireless handheld devices have a last contact with the server greater than one hour and thirty minutes on a weekday and three hours on a weekend, then an alert is generated. Other examples of criteria for generating an alert include but are not limited to: if five of the selected wireless handheld devices have last contact and pending values greater than a set limit; if ten of the selected wireless handheld devices at a location have last contact and pending values greater than a set limit; or if all of the selected wireless handheld devices have a last contact of a similar range. The ES Watcher service 108 uses the configuration data to determine when to generate alerts and/or to whom the alerts are sent.

In an exemplary embodiment, once the ES watcher service 108 has been configured, the ES watcher service 108 scans and updates monitored users (step 202). Function cleanUsersXml 302 scans through the monitored users on the ES database 105. The list of monitored users may be stored in the Users.xml file 302a. The Users.xml file 302a is updated with any changes in user data, such as if the service provider server 103 of the user has been changed. If the expiration date or time has passed in which the user was muted, function cleanUsersXml 302 will reinstate ("unmute") the user for monitoring and update the Users.xml file 302a.

The ES watcher service 108 clears its cache (step 203) after function checkConfig 301 is called. Function clearCache 303 is executed to reset statistical data used by the ES watcher service 108 as well as other data needed for the monitoring. In addition, function clearCache 303 may clear the queue of the ES watcher service 108, which may be used to store identification information for users who need to be alerted when certain events are detected in the ES 106.

Using the configuration data stored in the App.config file 301a, the ES watcher service 108 is configured with criteria for generating alerts (step 204). Function getWorkStatus 304 retrieves the configuration data stored in an App.config file 301a. Based on the configuration data and the current date and time, the function getWorkStatus 304 will set criteria for when an alert should be triggered. FIG. 2D is an example of the process used by the ES watcher service 108 for setting the criteria for generating alerts. This function retrieves the current date and time (step 204a). Based on the date and time, a determination is made as to whether it is work hours or non-work hours (step 204b). For example, if the current date and time retrieved from the ES watcher server 107 is 4:00 pm on a workday, then alert criteria for work hours will be used. However, if it is 4:00 pm on a Saturday, then alert criteria for non-work hours will be used.

Function getWorkStatus 304 may determine the maximum number of pending messages (step 204c). The maximum number of pending messages describes a factor in which a trigger can be generated if a user has more than the maximum number of pending messages in their mailbox. The number of pending messages for a wireless handheld device is generated using data stored on the ES database 106. Because some users may receive large numbers of messages in a short period of time, the number may be set to ten or more pending messages to avoid false alerts. The maximum time period of last contact a user has with the ES 106 or ES database 105 may also be determined (step 204*d*). In the alternative, the data for generating alerts may be based on scanning server logs for SRP connectivity, MAPI health, mail flow and connectivity to users' mailboxes. Function getWorkStatus 304 may determine the source mailboxes of the alerts (i.e., the user mailboxes that are being monitored) (step 204*e*) and to whom alerts are to be sent (step 204*f*).

The ES Watcher service 108 processes user data (step 205). For example, the function processUsers 305 may retrieve user identification information, such as a user ID, from the Users.xml file 302*a* or the App.config file 301*a*. The function may then create a list of user IDs. The user IDs are used to determine user statistics, such as the number of pending messages and the last contact time with the server for a user. Function processUsers 305 may identify permanently or temporarily "muted" users. These users will not be monitored while they are muted and therefore are not added to the list of user IDs. Once the monitoring list is generated by function processUsers 305, the function passes the list to the getStats function 306.

The monitoring list may identify multiple user IDs separated by a space delimiter to be processed by processUsers 305. Alternatively, function processUsers 305 may be a SQL function. By using this function, a single query can retrieve statistics about the monitored users. This can allow for better processing of statistics of the users being monitored and avoids having to monitor all of the users on the ES 105. In alternative embodiments, multiple queries can be used to retrieve data from the ES database 105.

The processed user data is then stored (step 206). For example, function getStats 306 may receive the list of user IDs from the processUsers 305 function and pass the list of user IDs to a stored procedure. In an exemplary embodiment, this procedure is a SQL server stored procedure called "procBESWatcher." The stored procedure may be used to query the ES database 105 and generate a data table (steps 207 and 208). The data table can contain various columns and rows containing data.

FIG. 5 illustrates an exemplary statistical data table. As shown in FIG. 5, the data table may contain a "User ID" column, a "Last Contact" column, and a "Pending" column. The data table may also include a date and time stamp and the last sent time/last forward time of a message. The data stored in the "User ID" column include user IDs, such as an email address or PIN for each user's wireless handheld device. The data stored in the "Last Contact" column includes the period of time that has passed since the last contact with the ES 106 for each user. The last contact period may be determined by taking the lowest value from the difference between the date and time stamp and the last sent time/last forward time data stored in the "Last Sent Time/Last Forward Time" column for each user. The data stored in the "Pending" column includes the number of pending messages for each user.

Function writeStats 306*a* can generate an XML file of the data table generated by the function getStats 306. This XML file, described as UsersStats.xml 306*b* in FIG. 3A, can be used for graphing statistics of monitored users by the ES watcher service 108. For example, statistics about users' wireless handheld devices and/or the enterprise servers can be generated. Additionally, the statistical data may be filtered based on parameters such as the carrier, the number of pending emails, or the total number of emails sent and received. The generated statistics may then be viewed through a web interface, for example.

The ES watcher service 108 compares the data stored in the data table, such as that shown in FIG. 5, to the criteria for generating alerts. For example, the function processRules 307 may launch and begin processing of the data stored in the data table shown in FIG. 5. The criteria set by function getWorkStatus 304 will be compared to the data stored in the data table. Function processPending 307*a* may take the number stored in each row of the "Pending" column for each user in the data table of FIG. 5 and compare it to the maximum number of pending messages value. If the number of pending messages for a user is greater than the maximum number of pending messages value, then the user ID, such as the user's name, email address, or PIN, will be added to a queue of the ES watcher service 108 for alerting (step 210). Function processLastContact 307*b* may take the number stored in each row of the "Last Contact" column for each user in the data table of FIG. 5 and compare it to the maximum last contact value. If the last contact for a user is greater than the maximum last contact value, then a user identification, such as the user's name, email address, or PIN, will be added to a queue of the ES watcher service 108 for alerting.

The function processQueue 308 may retrieve the queues generated from the function processPending 307*a* and the function processLastContact 307*b*. At step 211, the data in the queue may be sorted. For example, the function processQueue 308 may process the user ID data stored in the queues and sort the data. The sorting can be based on the data stored in the data table, such as the one shown in FIG. 5. For example, the sorting may be based on a user's electronic mail or the user ID.

The ES watcher service 108 generates emails or other alerts using data in the queue (step 212). The sorted list may be passed to the function genEmail 309. The function genEmail 309 may loop through the list and format the email based on the sorted list (step 213). The source and destination for the email may be set (step 214). For example, the function sendEmail 310 may set the source and destination of the email based on the configuration information, such as information identifying to whom alerts are to be sent. The ES watcher service 108 may then send the email(s) (step 215). For example, the function sendEmail 310 may pass the message to a configured SMTP (Simple Mail Transfer Protocol) host. This may be the email servers 104 shown in FIG. 1. The email servers then send the message to a recipient, such as an IT specialist monitoring the ES 105. It is to be understood that the alerts may be sent via other communication channels without departing from the scope of the invention. For example, IT specialists logged onto the ES 106 may receive direct alert feeds from the ES Watcher Service 108 without going through the email servers 104.

There may be several different types of email alerts generated. For example, a carrier alert may be generated when alert conditions are met for users across multiple enterprise servers, thereby indicating a potential issue with the carrier. An example of a carrier alert is shown in FIG. 6. The email may be formatted so that users are grouped by their associated enterprise server. As shown in FIG. 6, the exemplary alert indicates the users have a similar time period of no connectivity even though the users are assigned to different servers. Such conditions may indicate a potential issue with the carrier.

The data in the email may be separated by various delimiters. For example, the email may be formatted as follows:
  Server: ES01
  User: User1 (11) [0 Hr(s) 17 Mins]<80%>.
The server may be the enterprise server that a user's data is stored on. "User1" may be the name or user ID of the specific user from which the alert triggered. The value in ( ) may be the number of emails pending. The value in [ ] may be the amount of time that has passed since the last contact or last forward to the enterprise server. The value in < > may be the battery strength of the wireless handheld device.

FIG. 7 is an example of a server alert that indicates a potential issue with a particular enterprise server. The email alert may group the user or users based on the enterprise server. As shown in FIG. 7, the server alert indicates users having a similar time period of no connectivity on a common enterprise server. Such condition may indicate a problem with the identified enterprise server.

FIG. 8 is an example of a user alert that indicates a potential issue at the user level. For example, the alert in FIG. 8 may indicate that the handheld wireless device of the identified user may be out of service and has not been able to connect with the enterprise server. IT support may then attempt to troubleshoot the user's problem based on the email alert. Other email alerts may be generated by the ES watcher service 108 without departing from the scope of the invention.

The ES watcher service 108 may monitor and alert based on the battery level of a user's wireless handheld device. This monitoring can provide better insight into an alert sent by the service. For example, if a battery level is low, the wireless handheld device may turn off the wireless or a user may shut the device down. In this case, there are likely no major issues with the successful delivery of content, such as issues with internal servers or external carriers.

It will be apparent to those skilled in the art that various modifications and variations can be made in the enterprise server monitor of the present invention without departing from the spirit or scope of the invention. Thus, it is intended that the present invention cover the modifications and variations of this invention provided they come within the scope of the appended claims and their equivalents.

What is claimed is:

1. A system, comprising:
   one or more wireless handheld devices;
   one or more enterprise servers in communication with the one or more wireless handheld devices; and
   an enterprise server monitor in communication with the one or more enterprise servers configured to collect communications performance data, relating to communications between one or more of the one or more enterprise servers and one or more of the one or more wireless handheld devices, from one or more of the one or more enterprise servers in communication with one or more of the one or more wireless handheld devices associated with a select group of users, and to generate one or more alerts if the collected communications performance data match at least one of a plurality of alert conditions, each alert condition being indicative of at least one of a plurality of levels of potential communication failures, each of the plurality of levels of potential communication failures corresponding to at least one of the plurality of alert conditions,
   wherein the plurality of levels of potential communication failures include a carrier level failure, a server level failure, and a device level failure,
   wherein the carrier level failure occurs when communications performance data for at least two of the one or more wireless handheld devices communicating with at least two of the one or more enterprise servers matches one of the one or more alert conditions.

2. The system of claim 1, wherein one of the plurality of alert conditions includes an amount of pending electronic messages associated with the one or more wireless handheld devices and an amount of elapsed time since the one or more wireless handheld devices have communicated with the one or more enterprise servers.

3. The system of claim 1, wherein one of the plurality of alert conditions is different for work hours and non-work hours.

4. The system of claim 1, wherein the enterprise server monitor determines which of the one or more wireless handheld devices are associated with users muted from being monitored.

5. The system of claim 4, wherein the muted users are unmuted after a designated time period has expired.

6. The system of claim 1, wherein one of the plurality of alerts is transmitted via email.

7. The system according to claim 1, wherein a server level failure occurs when communications performance data for at least some of the one or more wireless handheld devices communicating with only one of the one or more enterprise servers matches one of the plurality of alert conditions.

8. An enterprise server monitor, comprising:
   a server in communication with one or more enterprise servers, the one or more enterprise servers in communication with one or more wireless handheld devices, the server including a watcher service to collect communications performance data, relating to communications between one or more of the one or more enterprise servers and one or more of the one or more wireless handheld devices, from one or more of the one or more enterprise servers in communication with one or more of the one or more wireless handheld devices associated with a select group of users, and to generate one or more alerts if the collected communications performance data match at least one of a plurality of alert conditions, each alert condition being indicative of at least one of a plurality of levels of potential communication failures, each of the plurality of levels of potential communication failures corresponding to at least one of the plurality of alert conditions,
   wherein the plurality of levels of potential communication failures include a carrier level failure, a server level failure, and a device level failure,
   wherein the carrier level failure occurs when communications performance data for at least two of the one or more wireless handheld devices communicating with at least two of the one or more enterprise servers matches one of the one or more alert conditions.

9. The communications server monitor of claim 8, wherein one of the plurality of alert conditions includes an amount of pending electronic messages associated with the one or more wireless handheld devices and an amount of elapsed time since the one or more wireless handheld devices have communicated with the one or more enterprise servers.

10. The communications server monitor of claim 8, wherein one of the plurality of alert conditions is different for work hours and non-work hours.

11. The communications server monitor of claim 8, wherein the watcher service determines which of the one or more wireless handheld devices are associated with users muted from being monitored.

12. The communications server monitor of claim 11, wherein the muted users are unmuted after a designated time period has expired.

13. The communications server monitor of claim 8, wherein one of the plurality of alerts is transmitted via email.

14. A method, comprising:
   selecting one or more users of one or more wireless handheld devices for monitoring;

collecting communications performance data, relating to communications between one or more of the one or more enterprise servers and one or more of the one or more wireless handheld devices, from one or more enterprise servers in communication with the one or more wireless handheld devices;

comparing the collected communications performance data with one or more alert conditions; and generating one or more alerts if the collected communications performance data match at least one of a plurality of alert conditions, each alert condition being indicative of at least one of a plurality of levels of potential communication failures, each of the plurality of levels of potential communication failures corresponding to at least one of the plurality of alert conditions, wherein the plurality of levels of potential communication failures include a carrier level failure, a server level failure, and a device level failure, wherein the carrier level failure occurs when communications performance data for at least two of the one or more wireless handheld devices communicating with at least two of the one or more enterprise servers matches one of the one or more alert conditions.

15. The method of claim 14, wherein one of the plurality of alert conditions include an amount of pending electronic messages associated with the one or more wireless handheld devices and an amount of elapsed time since the one or more wireless handheld devices has communicated with the one or more enterprise servers.

16. The method of claim 14, wherein one of the plurality of alert conditions are different for work hours and non-work hours.

17. The method of claim 14, wherein the step of generating one of the plurality of alerts includes determining which of the one or more wireless handheld devices are associated with users muted from being monitored.

18. The method of claim 17, wherein the muted users are unmuted after a designated time period has expired.

19. The method of claim 14, wherein one of the plurality of alerts is transmitted via email.

20. A non-transitory computer readable memory having stored thereon computer executable instructions that, when executed on a computer, configure the computer to perform a method comprising the steps of:

selecting one or more users of one or more wireless handheld devices for monitoring;

collecting communications performance data, relating to communications between one or more of the one or more enterprise servers and one or more of the one or more wireless handheld devices, from one or more enterprise servers in communication with the one or more wireless handheld devices;

comparing the collected communications performance data with one or more alert conditions; and generating one or more alerts if the collected communications performance data match at least one of a plurality of alert conditions, each alert condition being indicative of at least one of a plurality of levels of potential communication failures, each of the plurality of levels of potential communication failures corresponding to at least one of the plurality of alert conditions, wherein the plurality of levels of potential communication failures include a carrier level failure, a server level failure, and a device level failure, wherein the carrier level failure occurs when communications performance data for at least two of the one or more wireless handheld devices communicating with at least two of the one or more enterprise servers matches one of the one or more alert conditions.

21. The non-transitory computer readable memory of claim 20, wherein one of the plurality of alert conditions includes an amount of pending electronic messages associated with the one or more wireless handheld devices and an amount of elapsed time since the one or more wireless handheld devices has communicated with the one or more enterprise servers.

22. The non-transitory computer readable memory of claim 20, wherein one of the plurality of alert conditions is different for work hours and non-work hours.

23. The non-transitory computer readable memory of claim 20, wherein the step of generating one of the plurality of alerts includes determining which of the one or more wireless handheld devices are associated with users muted from being monitored.

24. The non-transitory computer readable memory of claim 23, wherein the muted users are unmuted after a designated time period has expired.

25. The non-transitory computer readable memory of claim 20, wherein one of the plurality of alerts is transmitted via email.

26. The system according to claim 7, wherein a device level failure occurs when communications performance data for only one of the one or more wireless handheld devices communicating with one or more enterprise servers matches one of the plurality of alert conditions.

* * * * *

UNITED STATES PATENT AND TRADEMARK OFFICE
CERTIFICATE OF CORRECTION

| | |
|---|---|
| PATENT NO. | : 8,793,362 B2 |
| APPLICATION NO. | : 11/987418 |
| DATED | : July 29, 2014 |
| INVENTOR(S) | : Khan et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this
Fourth Day of August, 2015

Michelle K. Lee
*Director of the United States Patent and Trademark Office*